United States Patent
Shachar et al.

(10) Patent No.: US 12,265,623 B2
(45) Date of Patent: Apr. 1, 2025

(54) FIRMWARE PROTECTION USING MULTI-CHIP STORAGE OF FIRMWARE IMAGE

(71) Applicant: EMC IP Holding Company LLC, Hopkinton, MA (US)

(72) Inventors: Tomer Shachar, Omer (IL); Maxim Balin, Gan Yavne (IL); Yevgeni Gehtman, Modi'in (IL); Or Herman Saffar, Beer Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 341 days.

(21) Appl. No.: 17/151,418

(22) Filed: Jan. 18, 2021

(65) Prior Publication Data
US 2022/0229909 A1    Jul. 21, 2022

(51) Int. Cl.
| | |
|---|---|
| *G06F 21/57* | (2013.01) |
| *G06F 11/14* | (2006.01) |
| *G06F 21/60* | (2013.01) |
| *G06F 21/79* | (2013.01) |

(52) U.S. Cl.
CPC ........ *G06F 21/572* (2013.01); *G06F 11/1415* (2013.01); *G06F 21/602* (2013.01); *G06F 21/79* (2013.01)

(58) Field of Classification Search
CPC ...... G06F 21/57; G06F 21/572; G06F 21/575; G06F 21/602; G06F 21/79
See application file for complete search history.

(56) References Cited

U.S. PATENT DOCUMENTS

| | | | |
|---|---|---|---|
| 10,395,054 B2* | 8/2019 | Resch | G06F 21/6227 |
| 10,534,618 B2* | 1/2020 | Balakrishnan | G06F 11/1417 |

(Continued)

FOREIGN PATENT DOCUMENTS

CN    114116305 A  *  3/2022

OTHER PUBLICATIONS https://www.microchip.com/forums/m224936.aspx, downloaded Jan. 13, 2021.

(Continued)

*Primary Examiner* — Jaweed A Abbaszadeh
*Assistant Examiner* — Cheri L Harrington
(74) *Attorney, Agent, or Firm* — Ryan, Mason & Lewis, LLP

(57) ABSTRACT

Techniques are provided for firmware protection using multi-chip storage of firmware images. One method comprises obtaining a firmware image; encrypting the firmware image; splitting the encrypted firmware image into a plurality of encrypted firmware image portions; and storing the plurality of encrypted firmware image portions on a plurality of recovery chips, wherein a threshold number of the encrypted firmware image portions from at least two different recovery chips are needed to reconstruct the firmware image. The threshold number of the encrypted firmware image portions can be obtained from the at least two different recovery chips and a validation can be applied to the obtained encrypted firmware image portions. The threshold number of encrypted firmware image portions may be obtained in response to a chip that stores the firmware image being inactive.

20 Claims, 7 Drawing Sheets

(56) References Cited

U.S. PATENT DOCUMENTS

| | | | | |
|---|---|---|---|---|
| 2010/0199125 | A1* | 8/2010 | Reche | G06F 11/108 |
| | | | | 714/E11.034 |
| 2012/0260106 | A1* | 10/2012 | Zaks | G06F 21/14 |
| | | | | 713/190 |
| 2014/0304520 | A1* | 10/2014 | Bobzin | G06F 21/572 |
| | | | | 713/187 |
| 2015/0365440 | A1* | 12/2015 | Billau | H04W 12/069 |
| | | | | 726/1 |
| 2019/0005245 | A1* | 1/2019 | Laffey | G06F 3/0632 |
| 2019/0065747 | A1* | 2/2019 | Gomes de Oliveira | |
| | | | | H04L 9/0643 |
| 2019/0073481 | A1* | 3/2019 | Angelino | G06F 8/65 |
| 2020/0042710 | A1* | 2/2020 | Liu | G06F 21/575 |
| 2020/0202002 | A1* | 6/2020 | Graham | G06F 21/575 |
| 2021/0286884 | A1* | 9/2021 | Lewis | H04L 63/0435 |

OTHER PUBLICATIONS https://www.checkpoint.com/downloads/products/iot-protect-firmware-solution-brief.pdf, downloaded Jan. 13, 2021.

https://www.ti.com/lit/an/slaa682/slaa682.pdf?ts=1610560606007, downloaded Jan. 13, 2021.

https://securityboulevard.com/2020/02/firmware-attacks-what-they-are-how-i-can-protect-myself/, downloaded Jan. 13, 2021.

Zhang et al., "Threshold Changeable Secret Sharing Schemes Revisited"; Theoretical Computer Science 418; p. 106-15 (2012).

* cited by examiner

FIRMWARE PROTECTION USING MULTI-CHIP STORAGE OF FIRMWARE IMAGE

FIELD

The field relates generally to information processing systems, and more particularly to the protection of such information processing systems.

BACKGROUND

Unauthorized modifications of device firmware, such as a Basic Input/Output System (BIOS), can present a significant threat due to the unique and privileged position of such firmware in the architecture of many devices. A BIOS, for example, comprises firmware used to initialize hardware during a boot process for a given device, and to provide runtime services for the operating system and programs of the given device. A malicious modification of the BIOS can cause a denial of service (e.g., if the BIOS is corrupted) and/or a persistent malware presence (e.g., if a malicious program is installed on the BIOS).

SUMMARY

In one embodiment, a method comprises obtaining a firmware image; encrypting the firmware image; splitting the encrypted firmware image into a plurality of encrypted firmware image portions; and storing the plurality of encrypted firmware image portions on a plurality of recovery chips, wherein a threshold number of the encrypted firmware image portions from at least two different recovery chips are needed to reconstruct the firmware image.

In some embodiments, the threshold number of the encrypted firmware image portions is obtained from the at least two different recovery chips and a validation is applied to the obtained encrypted firmware image portions. In at least one embodiment, at least the threshold number of encrypted firmware image portions is obtained in response to a chip that stores the firmware image being inactive. At least one additional encrypted firmware image portion can be obtained from at least one of the different recovery chips in response to at least one obtained encrypted firmware image portion failing the validation.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for firmware protection using multi-chip storage of firmware images.

In one or more embodiments, techniques are provided for the protection of firmware in hardware devices by storing portions of the firmware image of protected firmware in multiple recovery chips and using threshold-based firmware image reconstruction techniques to reconstruct the original firmware image, whereby a predefined number of portions of the original firmware image are needed from the multiple recovery chips to reconstruct the original firmware image. One or more aspects of the disclosure recognize that the likelihood that an attacker can obtain or attack a number of firmware image portions that is above the reconstruction threshold is significantly reduced. The term "firmware image" as used herein is intended to be broadly construed so as to encompass, for example, any copy or image of the firmware of a device, such as an image of BIOS firmware or cryptographic firmware, as well as various combinations or portions of such entities. In some embodiments, the firmware image and/or a firmware image portion may be flashed or burned (e.g., stored) on one or more associated chips, as discussed further below.

Figure 1:
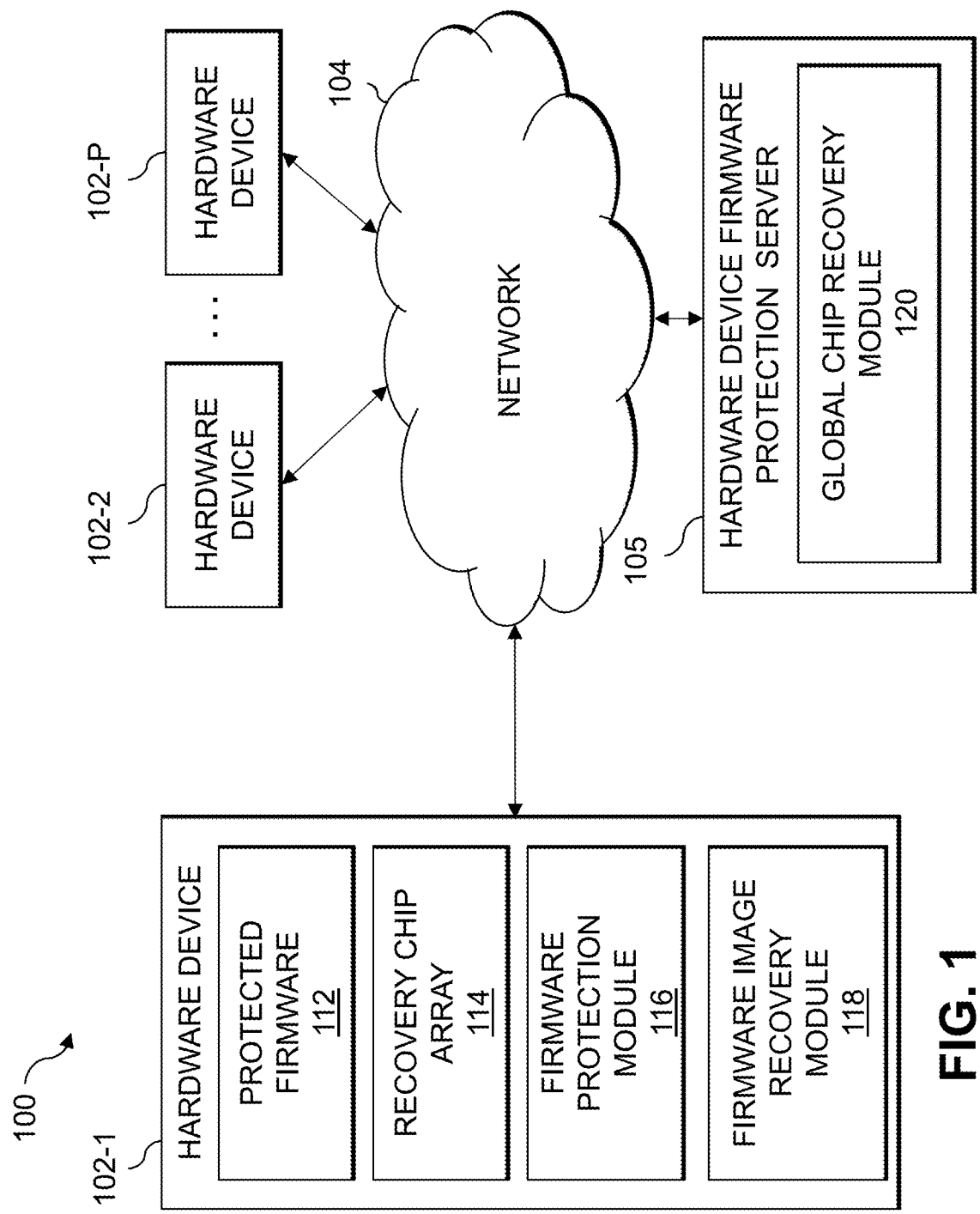
FIG. 1 illustrates an information processing system configured for firmware protection using multi-chip storage of a firmware image in accordance with an illustrative embodiment.

FIG. 1 shows a computer network (also referred to herein as an information processing system) 100 configured in accordance with an illustrative embodiment. The computer network 100 comprises a plurality of hardware devices 102-1 through 102-P, collectively referred to herein as hardware devices 102. The hardware devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is hardware device firmware protection server 105, discussed below.

The hardware devices 102 may comprise, for example, storage devices, host devices and/or user devices such as appliances, mobile telephones, laptop computers, tablet computers, desktop computers or other types of computing devices. Such devices are examples of what are more generally referred to herein as "processing devices." Some of these processing devices are also generally referred to herein as "computers." The hardware devices 102 may comprise a network client that includes networking capabilities such as ethernet, Wi-Fi, etc. When the hardware devices 102 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices. Such applications illustratively generate input-output (IO) operations that are processed by a storage system. The term "input-output" as used herein refers to at least one of input and output. For example, IO operations may comprise write requests and/or read requests directed to logical addresses of a particular logical storage volume of the storage system. These and other types of IO operations are also generally referred to herein as IO requests.

The hardware devices 102 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

In the example of FIG. 1, the exemplary hardware device 102-1 comprises protected firmware 112, a recovery chip array 114, as discussed further below, for example, in conjunction with FIG. 2, a firmware protection module 116 and a firmware image recovery module 118. As discussed further below, the protected firmware 112 (sometimes referred to as a protected firmware chip 112) may be implemented, for example, as a BIOS, a firmware chip, a TPM (Trusted Platform Module), or another cryptographic module, a CEC/CPC (Central Electronics Complex/Central Processor Complex) chip, and/or a BMC (Baseboard Management Controller) chip. It is noted that multiple protected firmware chips 112 can be protected using corresponding firmware images that are protected individually or together.

It is to be appreciated that this particular arrangement of modules 116 and 118 illustrated in the hardware device 102-1 of the FIG. 1 embodiment is presented by way of example only, and alternative arrangements can be used in other embodiments. For example, the functionality associated with modules 116 and 118 in other embodiments can be implemented as a single module or device, or separated across a larger number of modules. As another example, multiple distinct processors can be used to implement different ones of modules 116 and 118, or portions thereof.

At least portions of modules 116 and 118 may be implemented at least in part in the form of software that is stored in memory and executed by a processor. An exemplary process utilizing modules 116 and 118 of an example hardware device 102-1 in computer network 100 will be described in more detail with reference to the flow diagrams of, for example, FIGS. 2, 3, and 5.

It is to be appreciated that the term "user" as used herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The hardware device firmware protection server 105 may be implemented, for example, on the cloud or on the premises of an enterprise or another entity. In some embodiments, the hardware device firmware protection server 105, or portions thereof, may be implemented as part of a storage system or on a host device.

As also depicted in FIG. 1, the hardware device firmware protection server 105 further comprises a global chip recovery module 120. In some embodiments, the global chip recovery module 120 may implement and/or initiate global recovery operations of a given enterprise. As discussed further below in conjunction with FIG. 3, the global chip recovery module 120 may initiate a recovery of the protected firmware 112, using the recovery chip array 114, for example, when the protected firmware 112 does not respond to a ping message sent by the global chip recovery module 120.

Additionally, the hardware device firmware protection server 105 can have one or more associated databases (not shown) configured to store, for example, values pertaining to one or more exemplary hardware devices that may be protected using the disclosed techniques for firmware protection.

The databases can be implemented using one or more storage systems associated with the hardware device firmware protection server 105. Such storage systems can comprise any of a variety of different types of storage including such as network-attached storage (NAS), storage area networks (SANs), direct-attached storage (DAS) and distributed DAS, as well as combinations of these and other storage types, including software-defined storage.

The hardware devices 102 and the hardware device firmware protection server 105 may be implemented on a common processing platform, or on separate processing platforms. The hardware devices 102 (for example, when implemented as host devices) are illustratively configured to write data to and read data to/from a storage system in accordance with applications executing on those host devices for system users.

One or more of the protected hardware devices may comprise storage devices of a storage system. The storage devices illustratively comprise solid state drives (SSDs). Such SSDs are implemented using non-volatile memory (NVM) devices such as flash memory. Other types of NVM devices that can be used to implement at least a portion of the storage devices include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the storage system.

It is therefore to be appreciated that protected firmware chips 112 of numerous different types of storage devices can be protected in other embodiments. For example, a given storage system can include a combination of different types of protected storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

The term "storage system" as used herein is therefore intended to be broadly construed, and should not be viewed as being limited to particular storage system types, such as, for example, CAS (content-addressable storage) systems, distributed storage systems, or storage systems based on flash memory or other types of NVM storage devices. A given storage system as the term is broadly used herein can comprise, for example, any type of system comprising multiple storage devices, such as NAS, SANs, DAS and distributed DAS, as well as combinations of these and other storage types, including software-defined storage.

The hardware devices 102 are configured to interact over the network 104 with the hardware device firmware protection server 105 and/or storage devices. Such interaction illustratively includes generating IO operations, such as write and read requests, and sending such requests over the network 104 for processing by the hardware device firmware protection server 105.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the hardware devices 102 and the storage system to reside in different data centers. Numerous other distributed implementations of the host devices and the storage system are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the hardware device firmware protection server 105 can be one or more input-output devices (not shown), which illustratively comprise keyboards, displays or other types of input-output devices in any combination. Such input-output devices can be used, for example, to support one or more user interfaces to the hardware device firmware protection server 105, as well as to support communication between the hardware device firmware protection server 105 and other related systems and devices not explicitly shown.

The hardware devices 102 and the hardware device firmware protection server 105 in the FIG. 1 embodiment are assumed to be implemented using at least one processing device. Each such processing device generally comprises at least one processor and an associated memory, and implements one or more functional modules for controlling certain features of the hardware device firmware protection server 105.

More particularly, hardware devices 102 and hardware device firmware protection server 105 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

A network interface, as discussed further below in conjunction with FIG. 4, allows the hardware devices 102 and/or the hardware device firmware protection server 105 to communicate over the network 104 with each other (as well as one or more other networked devices), and illustratively comprises one or more conventional transceivers.

It is to be understood that the particular set of elements shown in FIG. 1 for firmware protection using multi-chip storage of firmware images is presented by way of illustrative example only, and in other embodiments additional or alternative elements may be used. Thus, another embodiment includes additional or alternative systems, devices and other network entities, as well as different arrangements of modules and other components.

Figure 2:
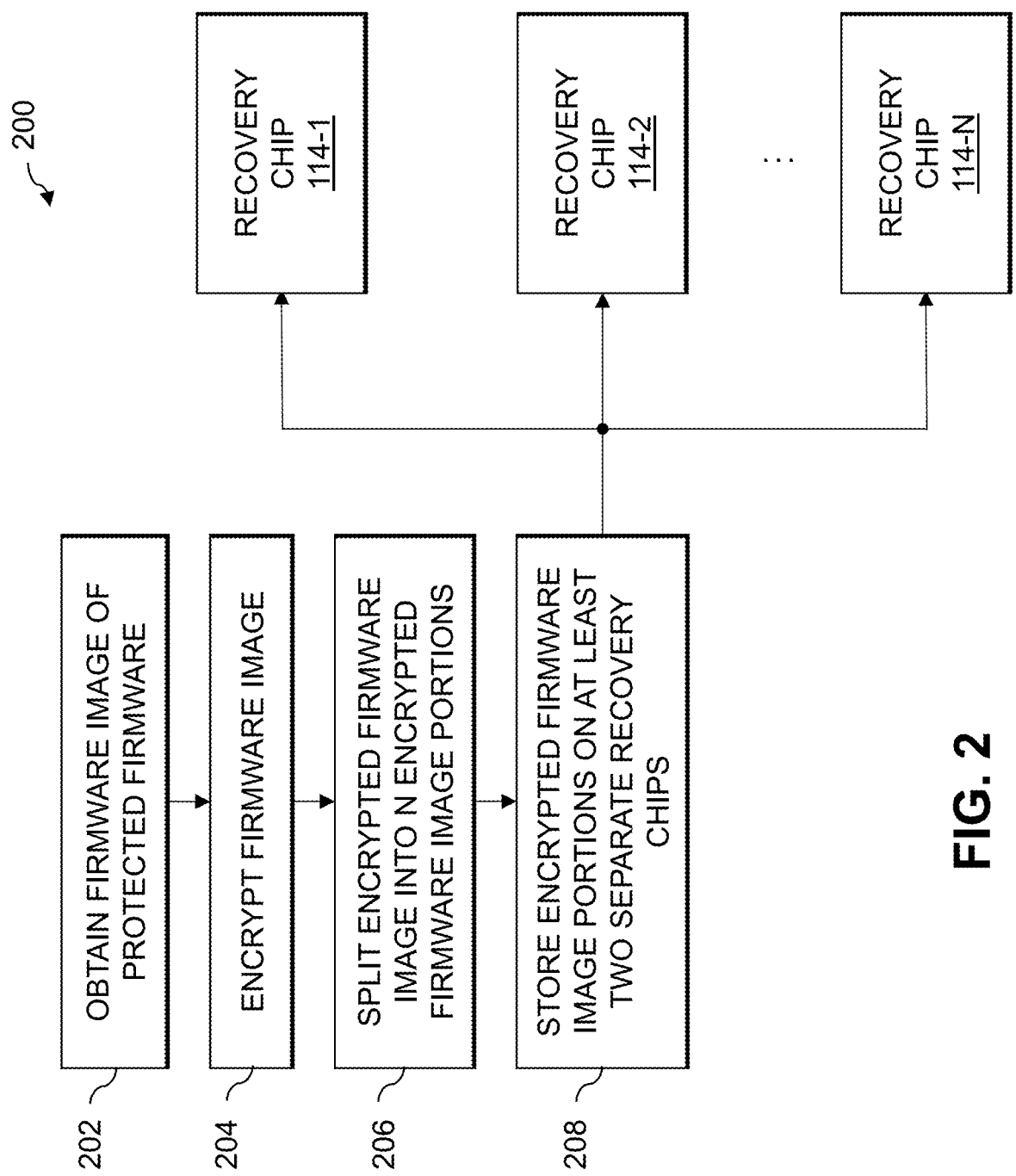
FIGS. 2 and 3 are flow diagrams illustrating exemplary implementations of firmware protection processes using threshold-based firmware image reconstruction, according to various embodiments.

FIG. 2 is a flow diagram illustrating an exemplary implementation of a firmware image splitting and multi-chip storage process 200 for threshold-based firmware image reconstruction, according to one or more embodiments. In some embodiments, the firmware image splitting and multi-chip storage process 200 is performed in-memory by the firmware protection module 116 of hardware device 102-1.

Generally, the storage functionality of the exemplary firmware image splitting and multi-chip storage process 200 allows portions of a firmware image to be stored on the recovery chip array 114. As shown in FIG. 2, the exemplary firmware image splitting and multi-chip storage process 200 initially obtains a firmware image of protected firmware 112 to be protected at step 202. At step 204, the exemplary firmware image splitting and multi-chip storage process 200 encrypts the firmware image. In at least some embodiments, the firmware image corresponds to a "clean" version of the firmware (e.g., "out of the factory") before data is generated by the firmware. In other embodiments, the firmware image can correspond to an operational version of the firmware and include data generated by the firmware, as would be apparent to a person of ordinary skill in the art.

The encrypted firmware image is split into N encrypted firmware image portions at step 206. For example, the N firmware image portions may comprise one or more shard portions and one or more parity portions (e.g., for error correction) using Reed-Solomon techniques. Generally, as noted above, the threshold-based firmware image reconstruction techniques require a predefined number (e.g., M) of the N firmware image portions to reconstruct the original firmware image, as would be apparent to a person of ordinary skill in the art. Consider a firmware image that is split into two shard portions and one parity portion, for a total of N=3 firmware image portions. In this example, two (=M) of the firmware image portions are needed to reconstruct the firmware image. Thus, as long as only one of the shard portions is corrupted or cannot otherwise be obtained, the firmware image can be reconstructed from the remaining shard portion and the parity portion. In another example, a firmware image that is split into four shard portions and two parity portions, for a total of N=6 firmware image portions. In this example, four (=M) of the firmware image portions are needed to reconstruct the firmware image. Thus, as long as only one or two of the shard portions are corrupted or cannot otherwise be obtained, the firmware image can be reconstructed from the remaining shard and parity portions.

At step 208, the encrypted firmware image portions are stored (e.g., flashed or burned) to at least two separate recovery chips 114, where each recovery chip 114 stores a different encrypted firmware image portion.

Figure 3:
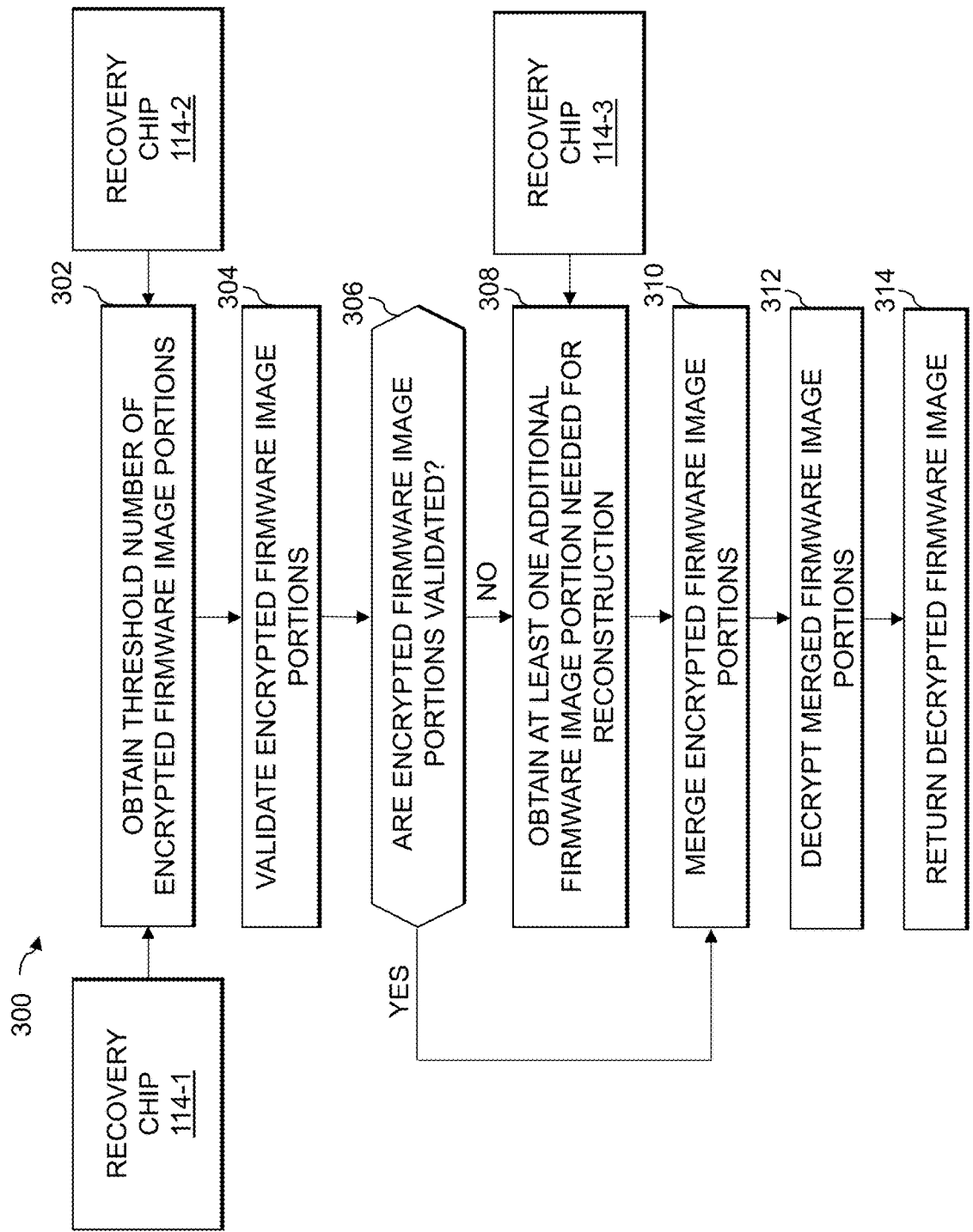

FIG. 3 is a flow diagram illustrating an exemplary implementation of a multi-chip firmware image reconstruction process 300 that uses threshold-based firmware image reconstruction, according to at least some embodiments. In the example of FIG. 3, assume that encrypted shard portions of the original firmware image are uploaded to recovery chips 114-1 and 114-2 and an encrypted parity portion is uploaded to recovery chip 114-3. In some embodiments, the multi-chip firmware image reconstruction process 300 is implemented by the firmware image recovery module 118 of the hardware device 102-1, for example, when protected firmware 112 fails to respond a ping message from the global chip recovery module 120 (for example, suggesting a successful ransomware or other malware attack).

In one or more embodiments, the exemplary multi-chip firmware image reconstruction process 300 obtains the threshold number of firmware image portions needed for reconstruction of the original firmware image. If one or more portions are missing or corrupted, the exemplary multi-chip firmware image reconstruction process 300 obtains one or more additional portions from one or more other recovery chips 114, so that the original firmware image can be reassembled, and the encryption can be removed before restoring the firmware image to the protected firmware 112.

As shown in FIG. 3, the exemplary multi-chip firmware image reconstruction process 300 initially obtains a threshold number of encrypted firmware image portions at step 302, and then validates the obtained encrypted firmware image portions at step 304. For example, a firmware image signature (e.g., a hash value and/or an MD5 message digest value) can be used to detect corruption of a given encrypted firmware image portion.

A test is performed at step 306 to determine if the obtained encrypted firmware image portions have been validated. If it is determined in step 306 that the obtained encrypted firmware image portions are not validated, then one or more additional encrypted firmware image portions needed for reconstruction are obtained at step 308. For example, if one or more shard portions are corrupted or cannot be obtained from recovery chip array 114-1 or 114-2, a parity portion can be obtained from recovery chip array 114-3 to perform error correction, in a known manner.

If, however, it is determined in step 306 that the obtained encrypted firmware image portions are validated (or after the encrypted firmware image portions needed for reconstruction are obtained at step 308), then the encrypted firmware image portions are merged at step 310 and the merged firmware image portions are decrypted at step 312. The decrypted firmware image is returned at step 314.

Figure 4:
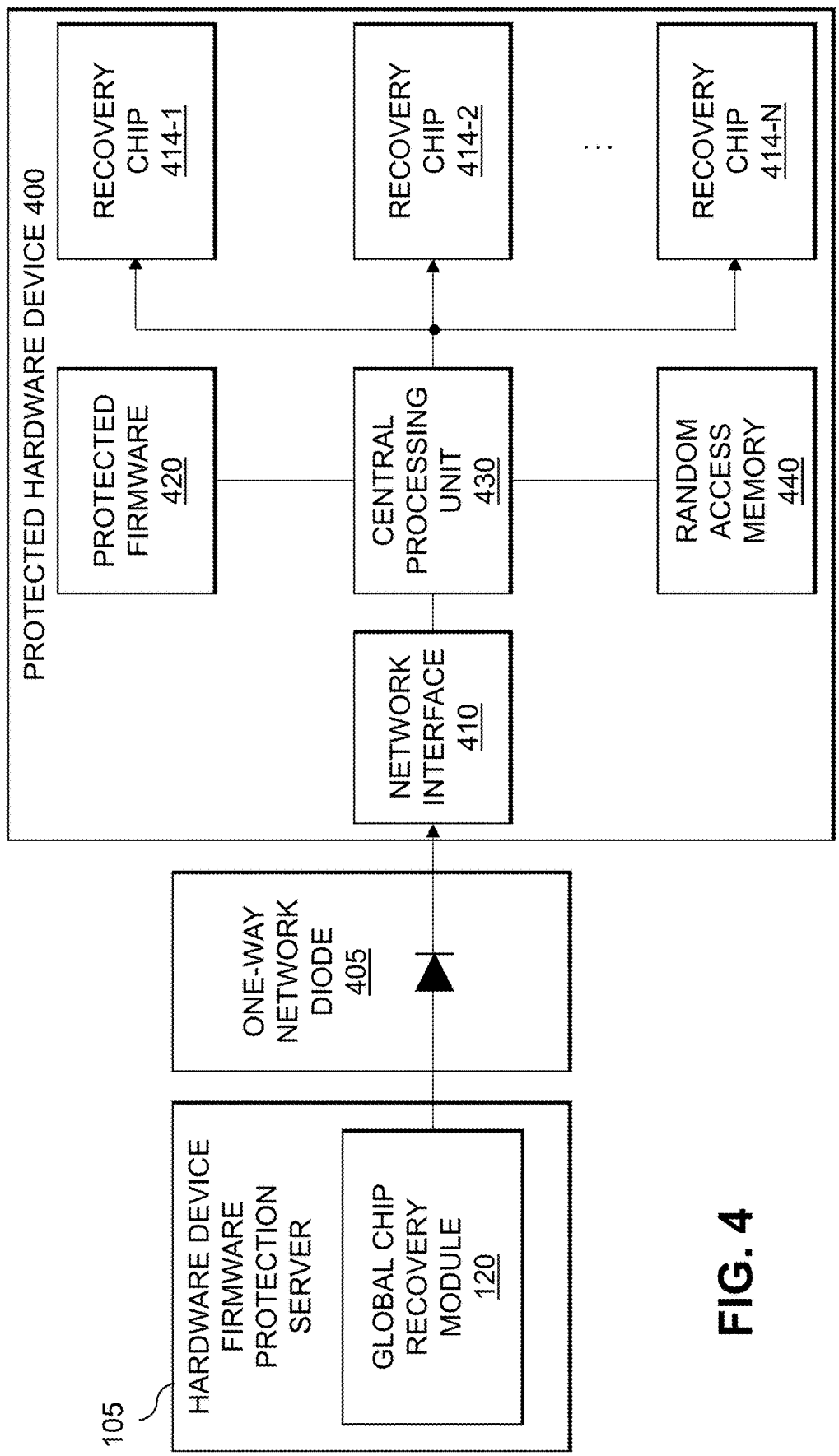
FIG. 4 illustrates the global chip recovery module of FIG. 1 initiating a recovery of the protected firmware of FIG. 1 using the firmware image portions stored on the recovery chip array of FIG. 1, according to an embodiment

FIG. 4 illustrates the global chip recovery module 120 of the hardware device firmware protection server 105 of FIG. 1 initiating a recovery of the protected firmware 112 of FIG. 1 using the firmware image portions stored on the recovery chip array 114 of FIG. 1, according to an embodiment. In some embodiments, the global chip recovery module 120 can send "ping" messages to (or receive heartbeat messages from) the protected firmware 112, for example, at regular or irregular intervals.

In the example of FIG. 4, the resiliency of the global chip recovery module 120 to outside attacks may be strengthened using a one-way network diode 405 to communicate a ping message, for example, to the network interface 410 of a protected hardware device 400. The ping message may comprise an Internet Control Message Protocol (ICMP) echo request to the protected firmware 420. The protected firmware 420 sends a reply message commonly known as a ping message. Thus, a ping command sends an ICMP echo request to the protected hardware device 400 on a network, and the protected hardware device 400 responds with an ICMP echo reply. The network interface 410 may employ a PXE (Pre eXecution Environment) protocol.

The disclosed firmware image recovery functionality may be triggered, for example, when the global chip recovery module 120 has not received a message or reply from the protected firmware 420 for a specified interval (for example, suggesting a successful ransomware or other malware attack). A central processing unit (CPU) 430 implements the multi-chip firmware image reconstruction process 300 of FIG. 3 to obtain the firmware image portions needed to reconstruct the firmware image from the recovery chips 414-1, 414-2 and 414-3, and to restore the protected firmware 420. The CPU 430 employs random access memory 440, as needed, during the reconstruction before the reconstructed firmware image is restored on the protected firmware 420.

It is noted that if stored data in the protected device has been encrypted by the operating system, and the BIOS is infected by ransomware, the encrypted data will be lost (as the ability to decrypt the data is lost). One or more remedial actions may be performed when an attack is detected using the disclosed ping mechanism. For example, the hardware device firmware protection server 105 can optionally initiate or execute one or more predefined remedial steps and/or mitigation steps to address the detected anomaly. For example, the predefined remedial steps and/or mitigation steps to address the detected anomalies may comprise the transmission of an alert or alarm to the hardware device 102 and/or user for important or suspicious events; isolating, removing, quarantining, limiting permissions, analyzing, and deactivating the protected hardware device 102, one or more of the hardware devices 102 and/or one or more files, accounts or aspects of the protected hardware device 102, or the user; notifying one or more third party systems (such as sending an email, or generating an alert in another system); restricting access of one or more accounts and one or more machines or services from accessing a network, files or folders; initiating a step-up authentication with one or more additional authentication factors; resetting or limiting permissions associated with a file or folder; quarantining one or more files or folders, and preventing one or more further actions from being executed associated with the protected hardware device 102, user account, service or machine associated with the detected anomalous activity.

Figure 5:
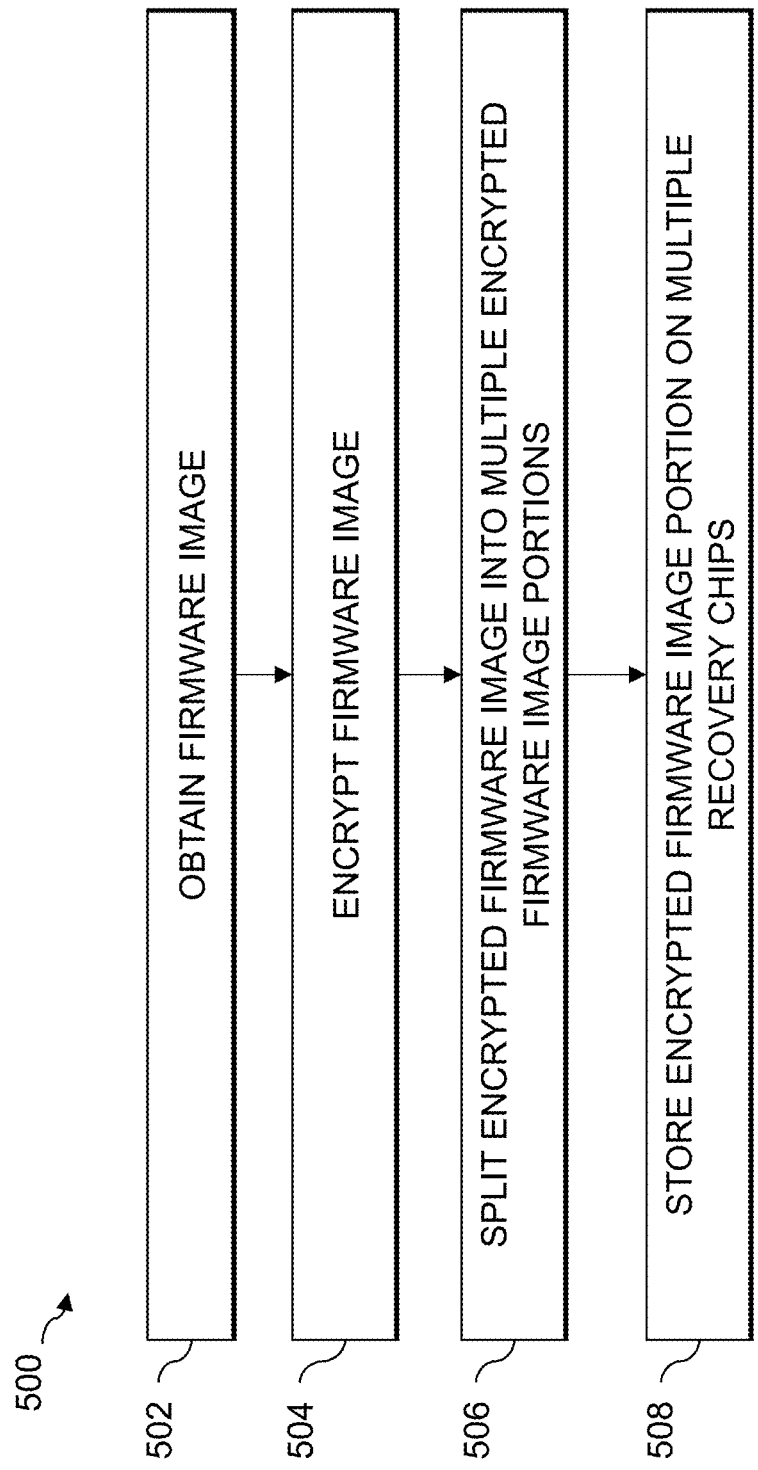
FIG. 5 is a flow chart illustrating an exemplary implementation of a firmware protection process that uses multi-chip storage of firmware images, according to one embodiment of the disclosure.

FIG. 5 is a flow chart illustrating an exemplary implementation of a firmware protection process 500 that employs multi-chip storage of firmware images, according to one embodiment of the disclosure. As shown in FIG. 5, the exemplary firmware protection process 500 initially obtains a firmware image at step 502. The firmware image is encrypted at step 504 and the encrypted firmware image is split into a plurality of encrypted firmware image portions at step 506. It is noted that in other embodiments, the plurality of encrypted firmware image portions can be generated by splitting the firmware image into a plurality of firmware image portions and then encrypting the plurality of firmware image portions.

The exemplary firmware protection process 500 then stores the plurality of encrypted firmware image portions on a plurality of recovery chips 114 at step 508. A threshold number of the encrypted firmware image portions from at least two different recovery chips 114 are needed to reconstruct the firmware image.

The particular processing operations and other network functionality described in conjunction with the flow diagrams of FIGS. 2, 3 and 5 are presented by way of illustrative example only, and should not be construed as limiting the scope of the disclosure in any way. Alternative embodiments can use other types of processing operations for firmware protection using multi-chip storage of firmware images. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

One or more embodiments of the disclosure provide improved methods, apparatus and computer program products for firmware protection using multi-chip storage of firmware images. The foregoing applications and associated embodiments should be considered as illustrative only, and numerous other embodiments can be configured using the techniques disclosed herein, in a wide variety of different applications.

Among other benefits, the disclosed techniques for firmware protection using multi-chip storage of the firmware image waste the time of a potential attacker, without their knowledge. The disclosed firmware protection techniques break the cyber kill chain at the first step, and the attacker is not aware of the inherent protection of the chip(s). Since portions of the protected firmware image in at least some embodiments are stored in different recovery chips, an attacker has to be able to access the threshold number of firmware portions in order to reconstruct the original firmware image. In addition, the reconstruction of the firmware image and the restoration of the firmware allows any damage that was done, for example, using ransomware to be reversed.

It should also be understood that the disclosed firmware protection techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for firmware protection using multi-chip storage of firmware images may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based firmware protection engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based firmware protection platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
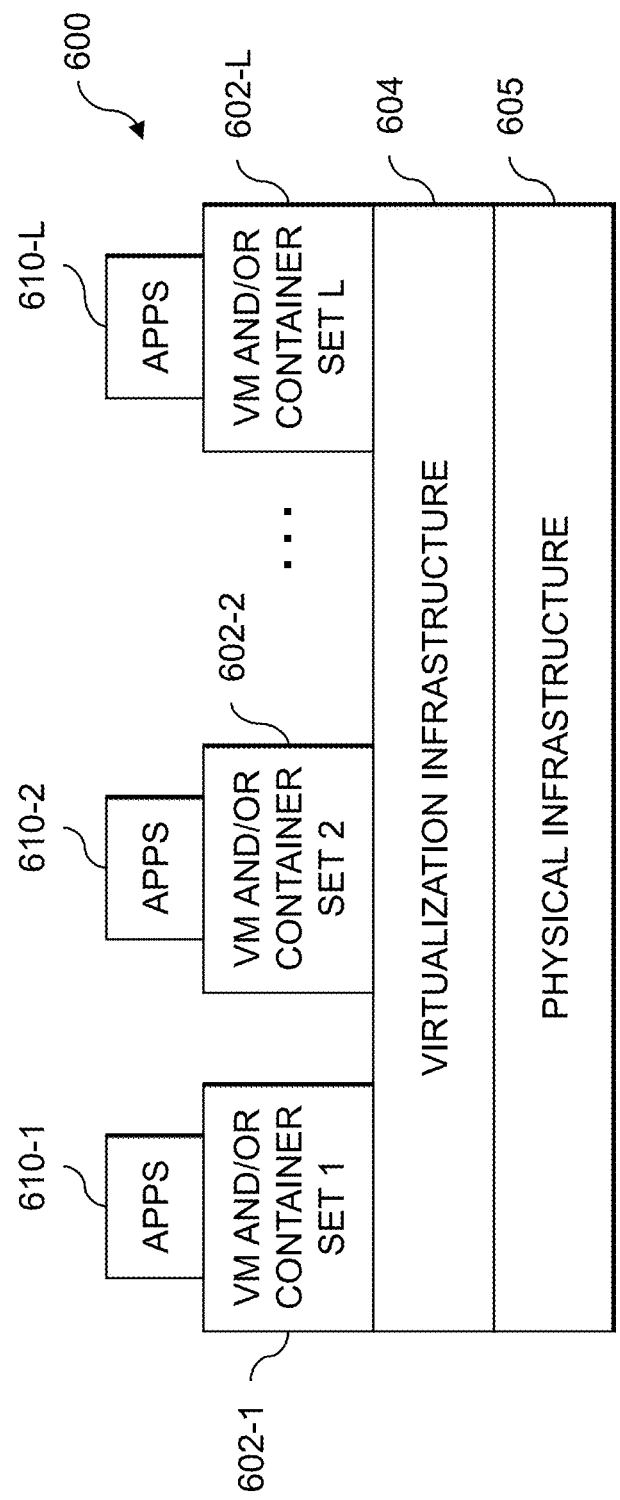
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide firmware protection functionality of the type described above for one or more processes running on a given one of the VMs. For example, each of the VMs can implement firmware protection control logic and firmware image reconstruction functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide firmware protection functionality of the type described above for one or more processes running on different ones of the containers. For example, a container host device supporting multiple containers of one or more container sets can implement one or more instances of firmware protection control logic and associated firmware image reconstruction functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a WAN, a LAN, a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an ASIC, an FPGA or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
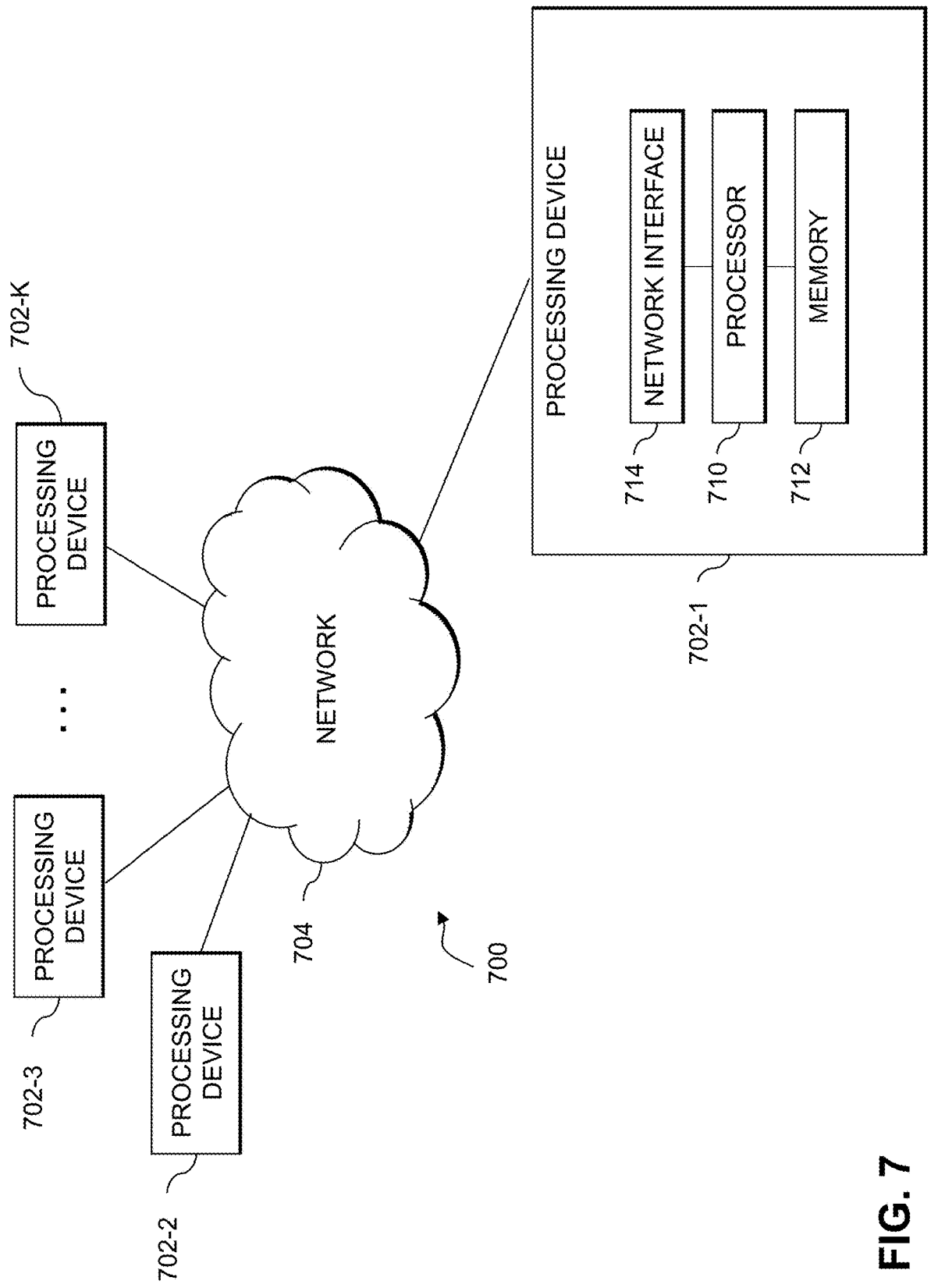
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell Technologies.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   obtaining a firmware image associated with a given processing device, wherein the given processing device comprises a plurality of distinct recovery chips, a firmware image chip that stores the firmware image and a processor coupled to a memory, and wherein at least two of the plurality of distinct recovery chips are physically within the given processing device;
   encrypting, by the given processing device, the firmware image;
   splitting, by the given processing device, the encrypted firmware image into a designated number of encrypted firmware image portions;
   storing, by the given processing device, the designated number of encrypted firmware image portions on respective ones of the plurality of distinct recovery chips of the given processing device, wherein a threshold number of the encrypted firmware image portions from at least two different recovery chips of the given processing device are needed by the given processing device to reconstruct the firmware image; and
   in response to determining that the firmware image chip is not responsive:
   (i) initiating an obtaining of at least the threshold number of the encrypted firmware image portions from the plurality of distinct recovery chips physically within the given processing device;
   (ii reconstructing the firmware image using a reconstruction process and the at least the threshold number of the encrypted firmware image portions obtained from the plurality of distinct recovery chips physically within the given processing device; and
   (iii) restoring the reconstructed firmware image in the firmware image chip that stores the firmware image;
   wherein, in response to the reconstruction process determining that one or more of the threshold number of the encrypted firmware image portions is one or more of corrupted and cannot be obtained from the plurality of distinct recovery chips physically within the given processing device, the reconstruction process obtains a different encrypted firmware image portion from a different distinct recovery chip physically within the given processing device.

2. The method of claim 1, wherein the designated number of the encrypted firmware image portions is greater than the threshold number.

3. The method of claim 1, wherein the threshold number of the encrypted firmware image portions is obtained from the at least two different recovery chips and a validation is applied to the obtained encrypted firmware image portions.

4. The method of claim 3, wherein at least one additional encrypted firmware image portion is obtained from at least one of the at least two different recovery chips in response to at least one obtained encrypted firmware image portion failing the validation.

5. The method of claim 3, further comprising merging the obtained encrypted firmware image portions to generate merged encrypted firmware image portions.

6. The method of claim 5, wherein the firmware image is reconstructed by decrypting the merged encrypted firmware image portions.

7. The method of claim 1, wherein the determining that the firmware image chip is not responsive comprises determining whether the firmware image chip (i) responds to a message communicated to the given processing device using a one-way network diode or (ii) sends a heartbeat message.

8. An apparatus comprising:
   at least one processing device comprising a processor coupled to a memory;
   the at least one processing device being configured to implement the following steps:
   obtaining a firmware image associated with a given processing device, wherein the given processing device comprises a plurality of distinct recovery chips, a firmware image chip that stores the firmware image and a processor coupled to a memory, and wherein at least two of the plurality of distinct recovery chips are physically within the given processing device;
   encrypting, by the given processing device, the firmware image;
   splitting, by the given processing device, the encrypted firmware image into a designated number of encrypted firmware image portions;
   storing, by the given processing device, the designated number of encrypted firmware image portions on respective ones of the plurality of distinct recovery chips of the given processing device, wherein a threshold number of the encrypted firmware image portions from at least two different recovery chips of the given processing device are needed by the given processing device to reconstruct the firmware image; and
   in response to determining that the firmware image chip is not responsive:
   (i) initiating an obtaining of at least the threshold number of the encrypted firmware image portions from the plurality of distinct recovery chips physically within the given processing device;
   (ii) reconstructing the firmware image using a reconstruction process and the at least the threshold number of the encrypted firmware image portions obtained from the plurality of distinct recovery chips physically within the given processing device; and
   (iii) restoring the reconstructed firmware image in the firmware image chip that stores the firmware image;

wherein, in response to the reconstruction process determining that one or more of the threshold number of the encrypted firmware image portions is one or more of corrupted and cannot be obtained from the plurality of distinct recovery chips physically within the given processing device, the reconstruction process obtains a different encrypted firmware image portion from a different distinct recovery chip physically within the given processing device.

9. The apparatus of claim 8, wherein the designated number of the encrypted firmware image portions is greater than the threshold number.

10. The apparatus of claim 8, wherein the threshold number of the encrypted firmware image portions is obtained from the at least two different recovery chips and a validation is applied to the obtained encrypted firmware image portions.

11. The apparatus of claim 10, wherein at least one additional encrypted firmware image portion is obtained from at least one of the at least two different recovery chips in response to at least one obtained encrypted firmware image portion failing the validation.

12. The apparatus of claim 10, further comprising merging the obtained encrypted firmware image portions to generate merged encrypted firmware image portions.

13. The apparatus of claim 12, wherein the firmware image is reconstructed by decrypting the merged encrypted firmware image portions.

14. The apparatus of claim 8, wherein the determining that the firmware image chip is not responsive comprises determining whether the firmware image chip (i) responds to a message communicated to the given processing device using a one-way network diode or (ii) sends a heartbeat message.

15. A non-transitory processor-readable storage medium having stored therein program code of one or more software programs, wherein the program code when executed by at least one processing device causes the at least one processing device to perform the following steps:
   obtaining a firmware image associated with a given processing device, wherein the given processing device comprises a plurality of distinct recovery chips, a firmware image chip that stores the firmware image and a processor coupled to a memory, and wherein at least two of the plurality of distinct recovery chips are physically within the given processing device;
   encrypting, by the given processing device, the firmware image;
   splitting, by the given processing device, the encrypted firmware image into a designated number of encrypted firmware image portions;
   storing, by the given processing device, the designated number of encrypted firmware image portions on respective ones of the plurality of distinct recovery chips of the given processing device, wherein a threshold number of the encrypted firmware image portions from at least two different recovery chips of the given processing device are needed by the given processing device to reconstruct the firmware image; and
   in response to determining that the firmware image chip is not responsive:
   (i) initiating an obtaining of at least the threshold number of the encrypted firmware image portions from the plurality of distinct recovery chips physically within the given processing device;
   (ii reconstructing the firmware image using a reconstruction process and the at least the threshold number of the encrypted firmware image portions obtained from the plurality of distinct recovery chips physically within the given processing device; and
   (ii restoring the reconstructed firmware image in the firmware image chip that stores the firmware image;
   wherein, in response to the reconstruction process determining that one or more of the threshold number of the encrypted firmware image portions is one or more of corrupted and cannot be obtained from the plurality of distinct recovery chips physically within the given processing device, the reconstruction process obtains a different encrypted firmware image portion from a different distinct recovery chip physically within the given processing device.

16. The non-transitory processor-readable storage medium of claim 15, wherein the threshold number of the encrypted firmware image portions is obtained from the at least two different recovery chips and a validation is applied to the obtained encrypted firmware image portions.

17. The non-transitory processor-readable storage medium of claim 16, wherein at least one additional encrypted firmware image portion is obtained from at least one of the at least two different recovery chips in response to at least one obtained encrypted firmware image portion failing the validation.

18. The non-transitory processor-readable storage medium of claim 16, further comprising merging the obtained encrypted firmware image portions to generate merged encrypted firmware image portions.

19. The non-transitory processor-readable storage medium of claim 18, wherein the firmware image is reconstructed by decrypting the merged encrypted firmware image portions.

20. The non-transitory processor-readable storage medium of claim 15, wherein the determining that the firmware image chip is not responsive comprises determining whether the firmware image chip (i) responds to a message communicated to the given processing device using a one-way network diode or (ii) sends a heartbeat message.

* * * * *